United States Patent
Ahmed et al.

(10) Patent No.: US 8,095,557 B2
(45) Date of Patent: Jan. 10, 2012

(54) TYPE SYSTEM FOR ACCESS CONTROL LISTS

(75) Inventors: Tanvir Ahmed, Hayward, CA (US); Thomas Keefee, Mill Valley, CA (US); Vikram Pesati, San Jose, CA (US); Eric Sedlar, Portola Valley, CA (US)

(73) Assignee: Oracle International Corporation, Redwood Shores, CA (US)

( * ) Notice: Subject to any disclaimer, the term of this patent is extended or adjusted under 35 U.S.C. 154(b) by 260 days.

(21) Appl. No.: 12/433,735

(22) Filed: Apr. 30, 2009

(65) Prior Publication Data

US 2010/0281060 A1 Nov. 4, 2010

(51) Int. Cl.
*G06F 17/30* (2006.01)
(52) U.S. Cl. ....................................................... 707/785
(58) Field of Classification Search ........... 707/2, 104.1, 707/785; 726/10
See application file for complete search history.

(56) References Cited

U.S. PATENT DOCUMENTS 6,279,111 B1 * 8/2001 Jensenworth et al. .......... 726/10
* cited by examiner

*Primary Examiner* — Etienne Leroux
(74) *Attorney, Agent, or Firm* — Hickman Palermo Truong & Becker LLP

(57) ABSTRACT

A method and storage media for performing access resolution using ACL types is provided. Under an AND semantic, an intersection set formed from the types of multiple ACLs protecting a resource may be utilized to efficiently determine whether a request for a privilege to access the resource is granted or denied. If the privilege is not a member of the intersection set, the privilege cannot be granted. A union set may be used for an OR semantic. A global ACL type may represent all privileges system-wide or application-wide. A global ACL may represent a system-wide or application-wide access policy. A conjunction of a global ACL and a regular ACL may be stored in a cache. The union set, intersection set, or access resolution may also be cached for subsequent request processing.

24 Claims, 6 Drawing Sheets

TYPE SYSTEM FOR ACCESS CONTROL LISTS

FIELD OF THE INVENTION

The present invention relates to controlling access to data.

BACKGROUND

A database management system ("DBMS") manages a database. A database management system may comprise one or more database servers. A database comprises database data and metadata that is stored on a persistent memory mechanism, such as a set of hard disks. Database data may be stored in one or more data containers. Each container contains records. The data within each record is organized into one or more fields. In relational database management systems, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Database servers manage resources. Such resources may include, for example, data containers such as tables or object classes, or the records stored within the data containers. Other resources include files and directories that store such files. Yet other resources may include functions, and the execution of functions. Although specific resources are described herein as examples, database servers manage numerous other resources, and resources are not limited to the resources explicitly described herein.

Database servers control access to resources, limiting access to such resources to only authorized users. Database applications specify access control policies on such resources by stating, in an access control list (ACL), what privileges users are granted. The database applications may specify that a certain user or role is granted or denied a privilege. However, multiple access control lists may protect the same resource, with some ACLs granting a privilege, and other ACLs denying the same privilege. To determine whether to grant the user the privilege, a database server performs access resolution. For access resolution, the database server examines at least some of the ACLs, and, based on the semantics of the application, make a determination whether the privilege is denied or granted. However, to process a large number of ACLs that protect a resource is inefficient, because there may be many tens of thousands of ACLs. Processing thousands of ACLs each time a user requests grant of a privilege wastes processing time, and delays access to data for users.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In an embodiment, a database server utilizes "ACL types" of ACLs for access resolution. When multiple ACLs protect a resource, the database server utilizes the ACL types of the multiple ACLs to resolve whether a privilege for a user is granted or denied for that resource. In an embodiment, the database server utilizes an intersection set of two or more ACL types to determine whether a privilege should or should not be granted to a user. In an embodiment, the database server utilizes an union set of two or more ACL types to resolve whether a privilege should or should not be granted to a user for a resource. In some circumstances, by examining the intersection set or union set, as appropriate, the database server may avoid extensive computations involving the multiple ACLs. In an embodiment, the database server stores an intersection set or a union set in a cache to facilitate subsequent access resolution. In an embodiment, the database server stores the result of resolving whether a user is granted a privilege in a cache. By utilizing the ACL types and caches, the database server decreases processing time and reduces delays, resulting in greater efficiency for the user. In some embodiments, the techniques disclosed herein are implemented in other than database servers. Embodiments of the invention are not limited to database servers.

Figure 1:
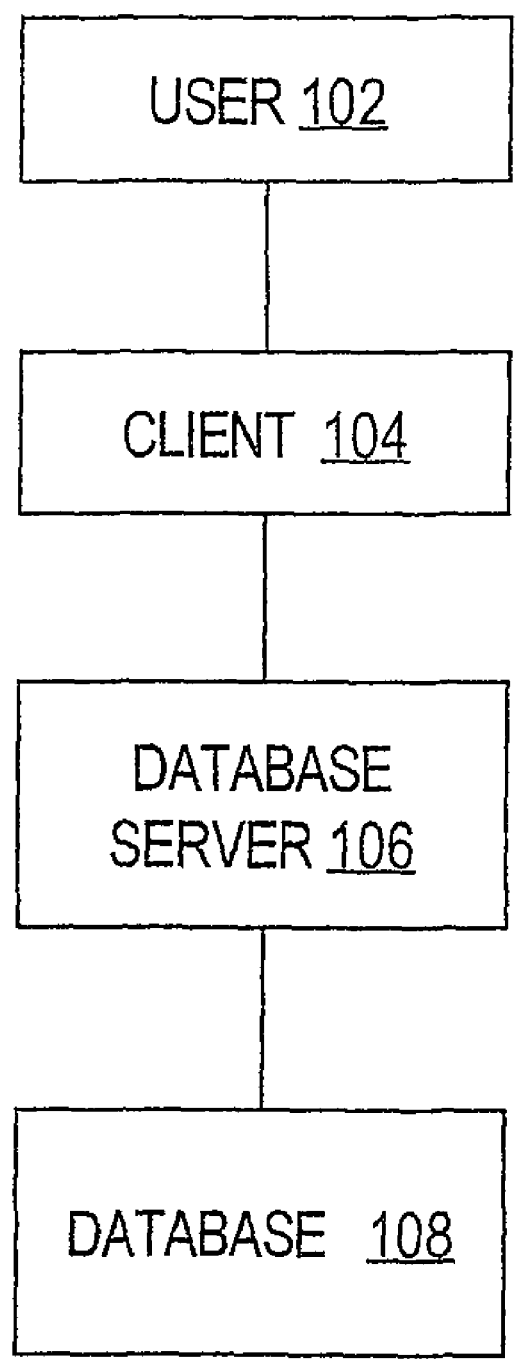
FIG. 1 is a block diagram illustrating an embodiment.

FIG. 1 is a block diagram illustrating an embodiment. In FIG. 1, a user 102 uses client 104 to interact with database server 106. Client 104 executes programs and issues queries to database server 106 for performing database operations. Client 104 may execute programs with functions, and the functions will be executed, at least partially, by database server 106. Client 104 may also issue queries to database server 106 to retrieve data stored in database 108. The queries may also include calls to functions that will be executed, at least partially, by database server 106. Database server 106 may host one or more database applications. Database server 106 may also access files in a directory for client 104. The data stored in database 108, the files, and the functions are examples of resources that are protected from unauthorized access using the techniques described herein. In some embodiments, other resources are also protected from unauthorized access using the techniques described herein.

Privileges

A database environment has a large number of privileges. Some privileges are predefined. Such predefined privileges include, for example, object privileges such as "read", "write", and "update". Other predefined privileges are system privileges, including, for example, "create_table". In addition, privileges may be defined for enterprise applications. Such application-defined privileges include, for example, "approve_purchase_order". An application can have a large number of application-defined privileges. An enterprise may have many applications. Thus, a database environment may have a large number of application privileges.

ACL Protection of Resources

In a database environment, an access control list (ACL) protects a resource by specifying subjects' access rights or privileges on the resource. The resource can be any type of resource, including, but not limited to, data in tables or other data containers, functions, and files. An ACL has access control entries (ACE) where each maintains a mapping from a subject to granted privileges. Each ACE is composed of three parts, which are 1) grant or deny 2) privilege and 3) subject. For example, an ACE may be (grant, read, John Smith). Subject can be a user name, such as "John Smith" or a role, such as "administrator".

An application may specify static binding of ACLs to resources. For example, one or more ACLs may be binded to a directory of files, and all the files in the directory are protected by the ACLs. The application may also specify dynamic binding of ACLs to resources. For example, the application may specify that one or more ACLs bind to rows of an employee table where employee ID numbers are randomly generated. Employee ID numbers 1-10 are protected by a first ACL, and employee ID numbers 11-20 are protected by a second ACL.

There may be some resources that have multiple ACLs protecting such resources. A privilege may be denied by one ACL and granted in a different ACL, for the same resource and subject. For example, a third ACL may dynamically bind to job responsibilities, such as for managers. Rows with employee data for managers are protected by the third ACL. The rows with employee data for managers may also be protected by the second ACL or the first ACL, leading to potential conflicts where one ACL denies a privilege and another ACL grants the privilege. With multiple ACLs protecting a resource, database server 106 uses access resolution to determine whether a privilege is granted or denied, based on the multiple ACLs. The result of access resolution depends on the semantics specified by the application for the protected resource.

Although examples are given where resources are files, directory of files, functions, and rows of data, embodiments of the invention are not limited to the resources disclosed herein. In some embodiments, any resource may be protected using techniques described herein.

ACL Inheritance

In an embodiment, an ACL can inherit ACEs from another ACL. In some embodiments, an ACL inherits from at most one other ACL. In some embodiments, an ACL may not inherit directly or indirectly from itself. In some embodiments, an ACL may not inherit from a nonexistent ACL. There are two kinds of ACL inheritance: extending inheritance and constraining inheritance. In extending inheritance, the grants that are explicitly declared in an inheriting ACL, also referred to as a child ACL, are extended by the grants that are defined by the parent ACL. In constraining inheritance, the grants that are explicitly declared in the child ACL must also be explicitly declared in the parent ACL. Extending inheritance is a set union operation, and constraining inheritance is a set intersection operation. When ACL a1 extends from ACL a2, the ACEs in both can be combined to determine whether a given subject is granted a given privilege. When ACL a1 is constrained with ACL a2, only the ACEs that are common to both a1 and a2 are used to determine a grant.

In extending inheritance, if either the child ACL or the parent ACL grants a privilege to the subject, then the privilege is granted. In constraining inheritance, if either the child ACL or the parent ACL does not grant the privilege to the subject, then the privilege is denied.

Figure 2:
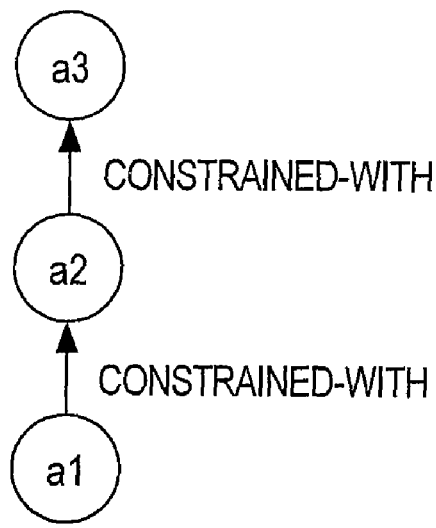
FIG. 2 is a block diagram illustrating ACL inheritance, according to an embodiment.

FIG. 2 is a block diagram illustrating ACL inheritance, according to an embodiment. In FIG. 2, ACL a1 is constrained by ACL a2. ACL a2 is constrained by ACL a3. Thus, if a privilege for a resource is not granted to a subject in either a1, a2, or a3, then the privilege is denied to the subject if ACL a1 protects the resource.

ACL Types

In an embodiment, every ACL is associated with an ACL type. An ACL type contains a set of privileges. Many ACLs can be of the same type. An ACL type defines a contract between an ACL and the resource the ACL protects, in terms of privileges that can be exercised. Only the privileges available in the ACL type can be granted or denied within ACLs associated with that ACL type. An ACL type can inherit privileges from one or more other ACL types. A child ACL type contains all the privileges in parent ACL types. In this inheritance hierarchy, the root ACL type contains no privilege. The root ACL type is also referred to as "top". All ACL types inherit, directly or indirectly, from top. Similarly, the ACL type "bottom" inherits all the privileges defined, which is all the privileges in all the ACL types. Cardinality of bottom changes as new privileges are defined or old privileges are removed. The ACL type inheritance hierarchy represents a lattice over all the privileges in the system with a subset relation between ACL types.

An ACL type may be defined explicitly or implicitly. An ACL type is explicitly created by declaring privileges for the ACL type, declaring inheritance relations with other ACL types, and assigning an ACL type to every ACL. In an embodiment, an access control administrator derives an optimal configuration of ACL types based on usages of the ACLs. However, explicit creation of an ACL type is not required. An ACL type for an ACL can be implicitly created based on privileges that are granted within an ACL.

Figure 3:
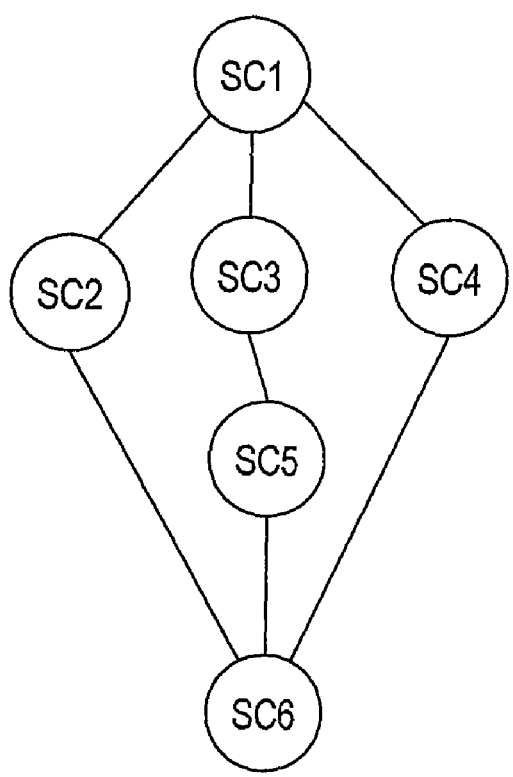
FIG. 3 is a block diagram illustrating an ACL type hierarchy, according to an embodiment.

FIG. 3 is a block diagram illustrating an ACL type hierarchy, according to an embodiment. An ACL type is also referred to as a security class. In FIG. 3, SC1 is the root ACL type of the ACL type hierarchy depicted in FIG. 3. The root ACL is also referred to as "top". In some embodiments, the root ACL type of an ACL type hierarchy is a null set. In other embodiments, the root ACL type of an ACL type hierarchy is a standard set of system privileges. SC6 is "bottom" and contains all the privileges inherited from the other security classes depicted in FIG. 3. Security classes SC2, SC3, and SC4 inherit privileges from SC1. SC5 inherits privileges from SC3, including privileges that are inherited from SC1. Embodiments of the invention may utilize a different ACL type hierarchy than the ACL type hierarchy depicted in FIG. 3, and embodiments of the invention are not limited to the ACL type hierarchy depicted in FIG. 3.

A type system for ACLs provides constraints that result in efficient implementations of access resolution. With many privileges and many ACLs, by concentrating only on the typed privileges of the associated ACLs, time and space complexity of access resolution is reduced. Moreover, the type system provides semantic understanding of an ACL in terms of privileges. Use of ACL types results in efficient implementation in at least the following areas: (1) Reduce computational complexity of access resolution by reducing the number of relevant privileges. (2) Optimize caching by reducing false invalidation by caching access resolution results (3) Provide an efficient mechanism to implement system-wide or application-wide ACLs that use access control policy constructs representing a large number of privileges.

AND & OR Semantics

When the request for a privilege involves two or more ACLs, grant or denial of the privilege may be based on several semantics specified by the database application. In an embodiment, these semantics fall under two broad categories of AND and OR relations between ACLs. The OR semantic is also referred to as extending, and the AND semantic is also referred to as constraining.

1.0 AND: Grant privilege if both ACLs grant the privilege;
If an ACL is constrained by another ACL, access resolution can only grant the privileges that are common to both the ACLs. In this constraining case, a privilege that is not available in both ACLs is not granted.

2.0 OR: Grant if either of the ACLs grant the privilege;
If an ACL is extended from another ACL, access resolution can grant a privilege that is present in either of the ACL types. This OR semantic can have conflicting meaning when one ACL grants and the other ACL denies the same privilege. In some embodiments, precedence rules and ordered evaluation are used to resolve this conflict.

2.1 OR with Precedence rules
"Deny has precedence over grant" semantic: when both grant and deny are present for a privilege, the privilege is denied.
"Grant has precedence over deny" semantic: when both grant and deny are present for a privilege, the privilege is granted.

2.2 OR with Ordered Evaluation
The first ACL that grants or denies the request for the privilege determines whether the privilege is granted or denied. After the first grant or deny is encountered, further evaluation of remaining ACLs is not required.

Below is the notation and model for ACL type-based access resolution of AND and OR semantics:

| | |
|---|---|
| a: T | ACL Type for ACL a |
| P(t) | Privileges in the ACL Type t |
| P | All privileges |
| a1 OR a2 | ACL a1 is extended from ACL a2 |
| a1 AND a2 | ACL a1 is constrained by ACL a2 |
| ∩ | Set intersection operator |
| U | Set union operator |

Top = { } and bottom = P

The type of an ACL is composed of the privileges available in the associated ACL Type. Assume ACLs a1 and a2 have t1 and t2 as their types, respectively. Then $a1:T=P(t1)$ $a2:T=P(t2)$ If ACL a1 is constrained by ACL a2, then $(a1 \text{ AND } a2):T=P(t1) \cap P(t2)$ That is, ACL a1 is constrained by ACL a2 and access resolution can only grant the privileges that are common to both ACLs.

If ACL a1 is extended from ACL a2, then $(a1 \text{ OR } a2):T=P(t1) U P(t2)$

That is, ACL a1 is extended from ACL a2 and access resolution can grant a privilege that is present in either of the ACL type for a1 or the ACL type for a2.

The above two rules provide the ACL Types for related ACLs. These two rules are used to calculate the ACL Type for ACLs that are in relation based on arbitrary AND and OR relations. Therefore, the privileges that may be granted are determined by the particular "constrained with" or "extended from" ACL inheritance, as well as the ACL type of an ACL. In some embodiments, the database application selects a precedence rule for AND and OR relations.

In an embodiment, ACL inheritance is right associative when ACLs are ordered from left to right as child to parent. In other embodiments, ACL inheritance is left associative when ACLs are ordered from left to right as parent to child. In such embodiments, for both right associativity and left associativity, the evaluation priority is from parent ACLs to child ACLs. For example, assume ACLs a1, a2, and a3 are associated with ACL types sc1, sc2, and sc3, respectively. ACL a1 is extended by a2, and a2 is constrained by a3. Then, in this example, the priority and grouping of ACLs for determining privileges that may be granted for ACL a1 (using right associativity and child a1 is at far left) is:

$(a1 \text{ OR } a2 \text{ AND } a3):T=P(sc1) U (P(sc2) \cap P(sc3))$

Example 1

$P(t1)=\{p1,p2,p3,p4\}$ $P(t2)=\{p1\}$ $(a1 \text{ AND } a2):T=P(t1) \cap P(t2)=\{p1\}=P(t2)$ Example 1 illustrates how, in an embodiment, database server 106 may use ACL types for access resolution. First, database server 106 only needs to evaluate and maintain results for the privileges contained in P(t2). Second, under an AND semantic, if an ACL grants a privilege that is not a member of the resultant intersection set of privileges {p1}, then no further ACL evaluation is required. Thus, even if ACL a1 grants a privilege p2, since p2 is not a member of the intersection set {p1}=P(t2), access resolution of (a1 AND a2) results in denial of privilege p2. Third, if access-resolution results are cached, cache invalidation can be optimized. In this example, modification of the ACL a1 that is not related to privileges contained in P(t2) does not require invalidation of the cached result for (a1 AND a2).

ACL Types for Access Resolution—"AND" Semantic

In an embodiment, a database server uses ACL types to efficiently perform access resolution. Access resolution may be performed for a requesting party ("user") that requests access to the resource. In an embodiment, when a resource is protected by multiple ACLs for a privilege, database server 106 uses the ACL types of the multiple ACLs to determine whether the privilege is granted to the user as a subject. For an AND relation between the ACLs, database server 106 examines an intersection set formed between the ACL types of the multiple ACLs to determine whether the privilege is a member of the intersection set. The intersection set is composed of privileges common to all ACL types of the multiple ACLs that protect the resource.

If the privilege for the subject is not a member of the intersection set, then database server 106 denies the privilege to the user. In an embodiment, according to an AND semantic, if the privilege is a member of the intersection set, but the privilege is denied by at least one ACL, then the privilege is denied to the user. The AND semantic may be specified by a database application, or may be specified by other than the database application. Although specific AND semantics are disclosed herein, different embodiments of ACL type-based access resolution may use other variations of AND semantics. Embodiments of the invention are not limited to the specific AND semantics disclosed herein.

Figure 4:
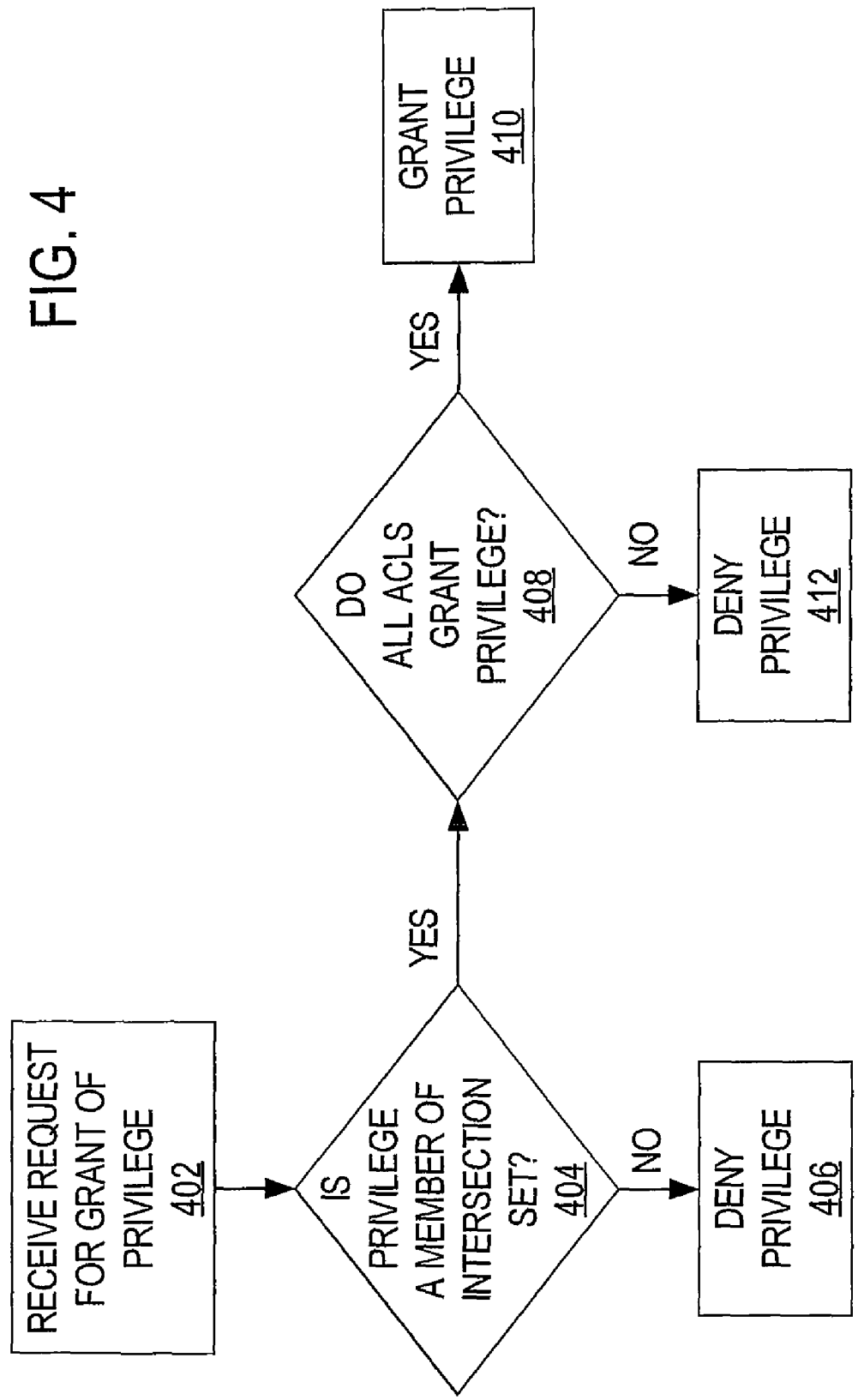
FIG. 4 is a flow diagram illustrating access resolution for an AND semantic, according to an embodiment.

FIG. 4 is a flow diagram illustrating access resolution for an AND semantic, according to an embodiment. In some embodiments, the steps depicted in FIG. 4 may be performed in an order other than the order depicted in FIG. 4. In some embodiments, the steps in FIG. 4 may be performed with other steps that are not depicted in FIG. 4. In some embodiments, not all steps of FIG. 4 are performed. In FIG. 4, database server 106 receives a request for grant of a privilege for a resource, in step 402. In step 404, database server 106 determines whether the privilege is a member of an intersection set that contains privileges common to all ACL types, of the multiple ACLs, that protect the resource. The intersection set may be a null set if there are no privileges common to all of the multiple ACLs. For step 404, database server 106 may use previously computed cached data that includes, but is not limited to, the privileges of the intersection set, whether the intersection set contains the privilege, or the result of the access resolution.

In step 406, database server 106 denies the privilege if the privilege is not a member of the intersection set. If the intersection set is the null set, then no privileges are in the intersection set, and database server 106 denies the privilege. In step 408, database server 106 determines whether all of the ACLs of the multiple ACLs grant the privilege. In step 410, database server 106 grants the privilege if all ACLs of the multiple ACLs grant the privilege. In step 412, database server 106 denies the privilege if not all of the ACLs grant the privilege.

In some embodiments, database server 106 examines the relationship between two ACL types to determine the intersection set. A child ACL type contains privileges that are contained in a parent ACL type. More generally, an ancestor ACL type contains privileges that are also contained in ACL types that are descendents of the ancestor ACL type. Thus, two ACL types that are both descendents of the same ancestor in an ACL hierarchy will each contain the ancestor ACL type's privileges. For a pair of ACL types that have an ancestor-descendent relationship, database server 106 can determine the intersection set of the pair of ACL types by examining the privileges of the ancestor ACL type, without needing to inspect the privileges of the descendent ACL type.

ACL Types for Access Resolution—"OR" Semantic

For an OR relation between multiple ACLs that protect a resource, database server 106 may use ACL types of the multiple ACLs to determine whether the privilege is granted to the user. Database server 106 examines an union set between the ACL types of the multiple ACLs to determine whether the privilege is a member of the union set. If the privilege is not a member of the union set, then database server 106 denies the privilege to the user. If the privilege is a member of the union set, and only deny is present in the ACLs, then database server 106 denies the privilege. Likewise, if the privilege is a member of the union set, and only grant is present in the ACLs, then database server 106 grants the privilege. If the privilege is a member of the union set, and both deny and grant are present in the ACLs, then database server 106 grants or denies based on the specific OR semantics specified by the database application. In some embodiments, the OR semantics are specified by other than the database application. For an OR semantic with grant taking precedence over deny, database server 106 grants the privilege when both grant and deny are present in the multiple ACLs. For an OR semantic with deny taking precedence over grant, database server 106 denies the privilege when both grant and deny are present in the multiple ACLs. For an OR semantic with ordered evaluation, the first ACL, of the multiple ACLs, that grants or denies the requested privilege determines whether the privilege is granted or denied.

Although specific OR semantics are disclosed herein, different embodiments of ACL type-based access resolution may use other variations of OR semantics. Embodiments of the invention are not limited to the specific OR semantics disclosed herein.

Figure 5:
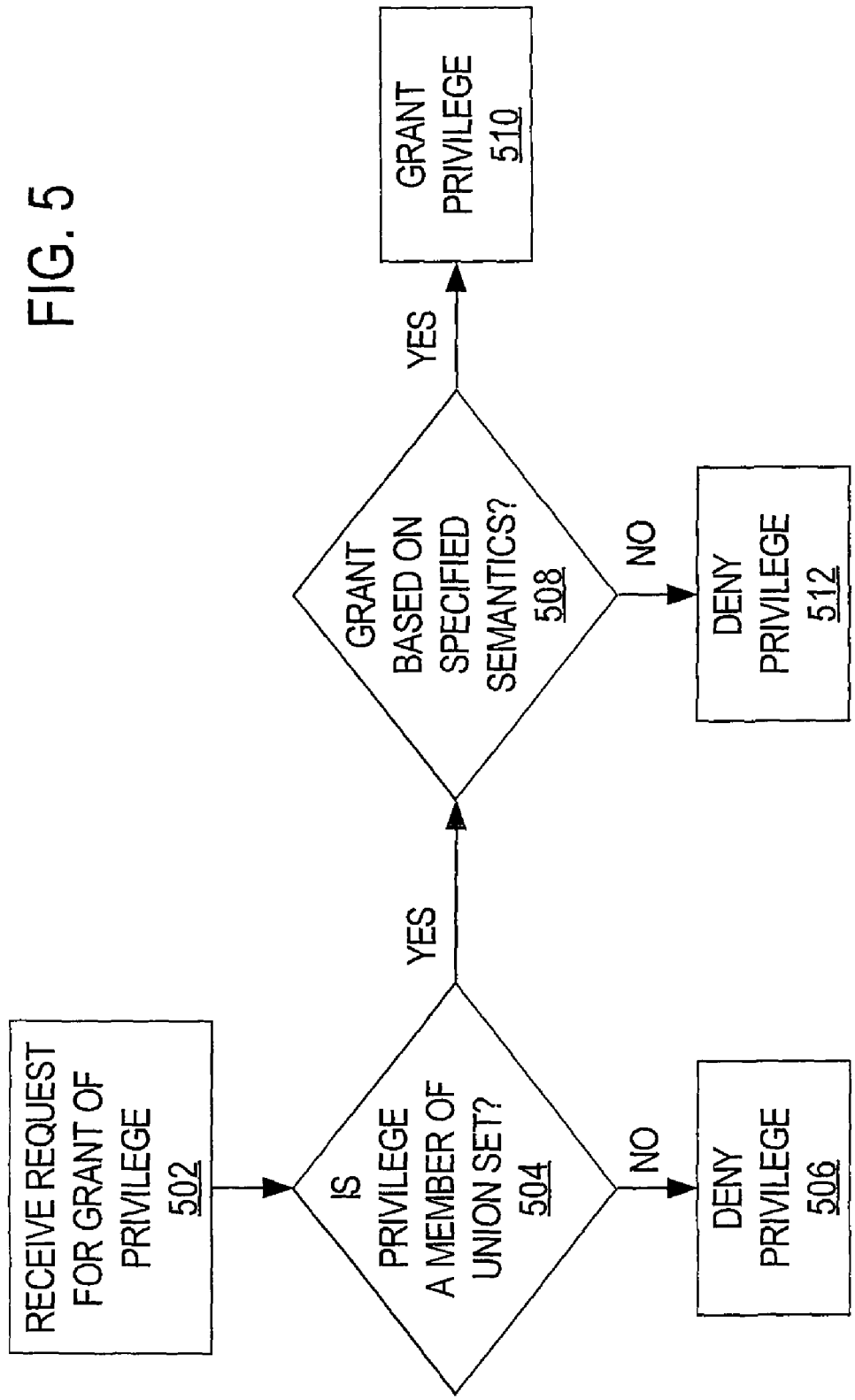
FIG. 5 is a flow diagram illustrating access resolution for an OR semantic, according to an embodiment.

FIG. 5 is a flow diagram illustrating access resolution for an OR semantic, according to an embodiment. In some embodiments, the steps depicted in FIG. 5 may be performed in an order other than the order depicted in FIG. 5. In some embodiments, the steps in FIG. 5 may be performed with other steps that are not depicted in FIG. 5. In some embodiments, not all steps of FIG. 5 are performed. In FIG. 5, database server 106 receives a request for grant of a privilege for a resource, in step 502. In step 504, database server 106 determines whether the privilege is a member of an union set. The union set is composed of all privileges in all ACL types of the multiple ACLs that protect the resource. In other words, if a privilege is in at least one of the ACL types, then the privilege is a member of the union set. The union set may be a null set if there are no privileges in all ACL types of the multiple ACLs. For step 504, database server 106 may use previously computed cached data that includes, but is not limited to, the privileges of the union set, whether the union set contains the privilege, or the result of the access resolution.

In step 506, database server 106 denies the privilege if the privilege is not a member of the union set. If the union set is the null set, then no privileges are in the union set, and database server 106 denies the privilege. In step 508, database server 106 determines whether to grant or deny the privilege, based on application-specified OR semantics. As disclosed herein, OR semantics may include grant taking precedence over deny, deny taking precedence over grant, ordered evaluation, or other OR semantics. In step 510, database server 106 grants the privilege according to the specified OR semantics. In step 512, database server 106 denies the privilege according to specified OR semantics.

Global ACL Types & Global ACLs

In some cases, a database application may specify access rules that have system-wide scope or that have application-wide scope. For example, the database application may specify that all users not yet authenticated are limited to reading only a limited set of resources. Also, the application may specify that all users from outside a firewall are denied access to resources. To facilitate such access rules, the database application may utilize "global ACL types".

A global ACL type is a construct that represents all privileges during execution time, also referred to as the ACL type that is "bottom" in an ACL type hierarchy. The global ACL type may have a system-wide scope, representing all privileges in the database system. Alternatively, the global ACL type may have an application-wide scope, representing all privileges in an application. The database application may utilize multiple global ACL types, for representing all privileges system-wide, and for representing all privileges application-wide. In some embodiments, the scope of privileges represented by a global ACL type may include a scope other than system-wide privilege scope or application-wide privilege scope. The privileges represented by a global ACL type represent a dynamically changing set of privileges during execution time, since privileges may be added or removed.

In an embodiment, a "global ACL" may be of a global ACL type that is system-wide in scope. ACLs that are not of a global ACL type henceforth may be described as "non-global ACLs" or "regular ACLs". Alternatively, the global ACL may also be of a global ACL type that is application-wide in scope. The database application may use the global ACL to specify that all privileges in the database system or the database application are denied to a subject or subjects, and may include exceptions for certain privileges. Likewise, the database application may use the ACL to specify that all privileges in a system or the database application are granted to a subject or subjects, and may include exceptions for certain privileges.

Example 2

Assuming g1 is a global ACL that is system-wide in scope and ACL type t1 contains all the privileges P in the database system, then $$(g1 \text{ AND } a2):T=P(t1) \cap P(t2) = P \cap P(t2) = P(t2)$$

Example 2 illustrates how, in an embodiment, database server 106 may use ACL types for access resolution with global ACLs that are system-wide in scope. A global ACL that is the system-wide in scope may specify access rights over all the privileges in the database system. In an embodiment, a global ACL that is system-wide in scope contains many ACEs and constrains every ACL in the database system. New privileges and ACEs may be added to the global ACL that is the system-wide in scope. In an embodiment, database server 106 performs access resolution involving global ACLs that are system-wide in scope by only examining the privileges contained in P(t2). Because of the AND semantic, database server 106 may ignore any privileges that are not contained in P(t2). Caching of access resolution results is efficient since grants and denials of new privileges in ACL g1 do not invalidate the cache result for (g1 AND a2). The techniques disclosed herein also apply to global ACLs that have a scope other than system-wide scope, including, but not limited to, application-wide scope. In some embodiments, database server 106 performs access resolution involving global ACLs that are application-wide in scope by only examining the privileges contained in P(t2). In some embodiments, database server 106 performs access resolution involving global ACLs that are of arbitrary scope by only examining the privileges contained in P(t2).

In an embodiment, database server 106 applies AND semantics to a global ACL, in conjunction with one or more regular ACLs, to perform access resolution for a subject. Database server 106 determines whether a privilege, requested by a user, is a member of an intersection set composed of all privileges common to the global ACL and the one or more regular ACLs. For example, if an ACL a1 grants privilege p2 to Tom Jones, and a global ACL g2 denies all privileges to Tom Jones and grants only privilege p1 to Tom Jones, then for a1 AND g2, Tom Jones is denied p2, and denied all other privileges, including p1. Also, if an ACL a1 grants privilege p2 to Tom Jones, and a global ACL g2 denies all privileges to all subjects except for granting only privilege p1 to Tom Jones, then for a1 AND g2, Tom Jones is denied p2, and denied all other privileges, including p1. However, if ACL a1 grants p1 to Tom Jones, then database server 106 grants p1 to Tom Jones because a1 AND g2 grants privilege p1. In some embodiments, ACL a1 is an ACL that inherits from the global ACL g2, and a1 is constrained with g2. Thus, a1 can only grant the privileges that are granted by g2. In this example, a1 constrained with g2 means a1 can only grant privilege p1, since g2 only grants p1.

Caching for Efficient Access Resolution

In an embodiment, for efficient access resolution with global ACLs, database server 106 determines the privileges in an intersection set between a global ACL type and a non-global ACL type. In some embodiments, database server 106 need not examine all privileges and ACEs in the global ACL. Rather, database server 106 only examines the privileges that are in the intersection set. Database server 106 may cache the intersection set, and associate the cached data with the non-global ACL type. The intersection set stored in the cache is read and utilized when database server 106 subsequently performs access resolution. In some embodiments, database server 106 may store, in a cache, the result of access resolution involving a global ACL.

In some embodiments, database server 106 determines the privileges in an intersection set between non-global ACL types, and caches the intersection set. Database server 106 may also cache results of access resolution between non-global ACL types.

Figure 6:
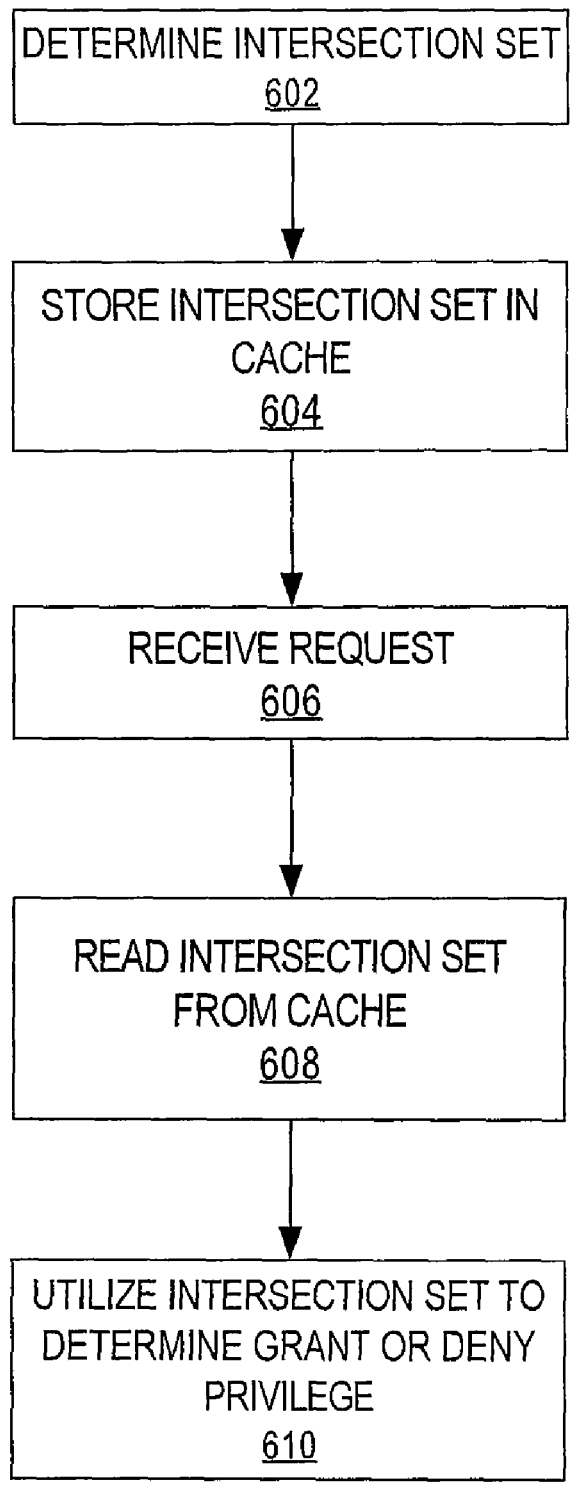
FIG. 6 is a flow diagram illustrating access resolution with a cache, according to an embodiment.

FIG. 6 is a flow diagram illustrating access resolution with a cache, according to an embodiment. In some embodiments, the steps depicted in FIG. 6 may be performed in an order other than the order depicted in FIG. 6. In some embodiments, the steps in FIG. 6 may be performed with other steps that are not depicted in FIG. 6. In some embodiments, not all steps of FIG. 6 are performed. In FIG. 6, database server 106 determines an intersection set, in step 602. In step 604, database server 106 stores the intersection set in the cache. In step 606, database server 106 receives a request for grant of a privilege from a user. Database server 106 may perform access resolution using an AND semantic. In step 608, database server 106 reads intersection set data from the cache. In step 610, database server 106 utilizes the intersection set data to determine whether to grant or deny the privilege to the user.

In some embodiments, database server 106 may store the cache data as part of processing a request for grant of a privilege from a user. Database server 106 may then read the stored cache data for processing subsequent requests. The data stored in the cache may be other than intersection set data, such as union set data, or access resolution result data.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
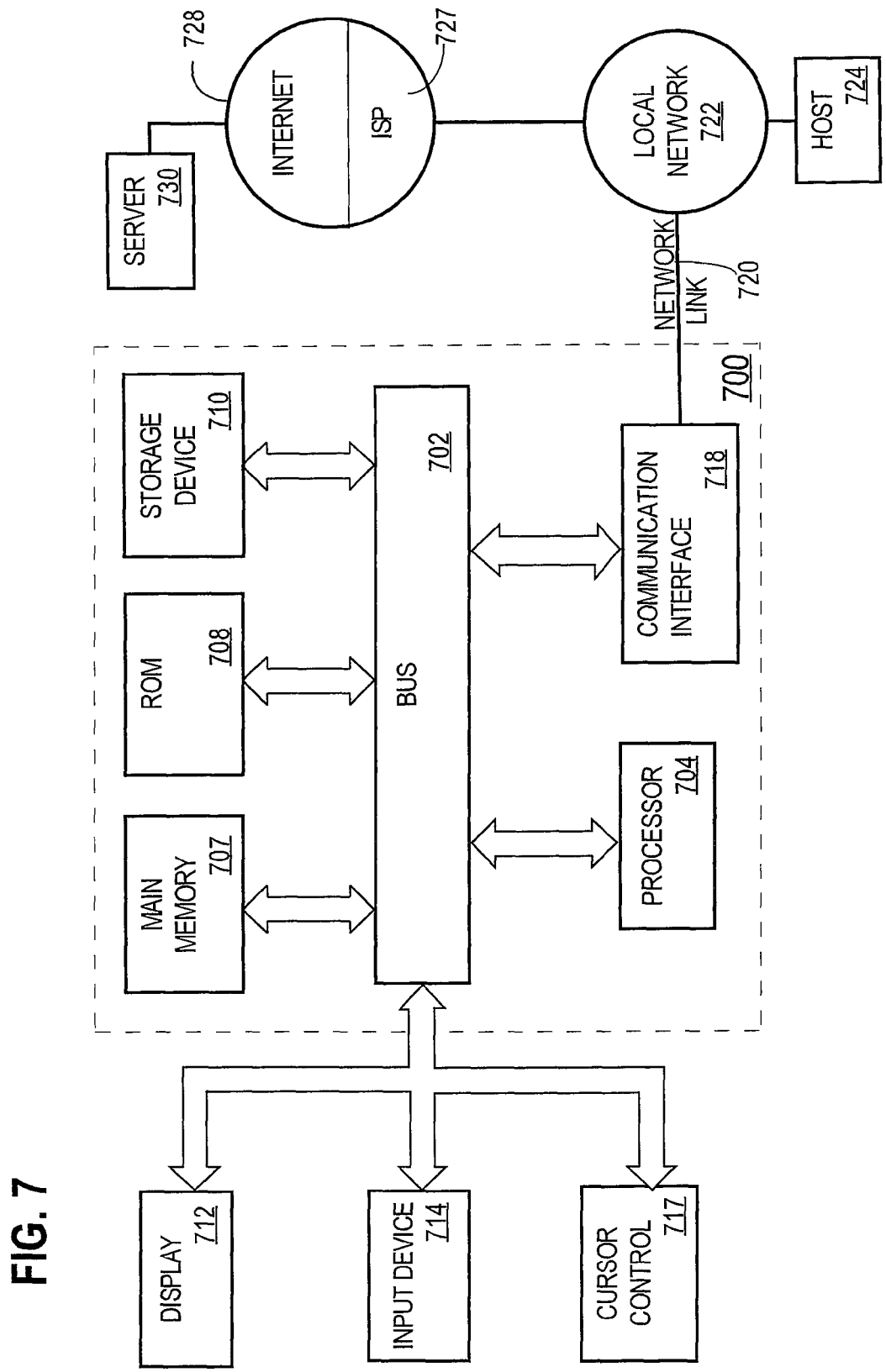
FIG. 7 is a block diagram of a system upon which the techniques described herein may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-implemented method, comprising:
   receiving a request that requires a privilege for a resource;
   wherein said resource is protected by at least two ACLs;
   wherein said at least two ACLs are associated with at least two ACL types, wherein among said at least two ACLs and said at least two ACL types, each ACL is associated with a different ACL type that is not associated any other ACL;
   determining that said privilege is not a member of an intersection set containing privileges that are common to all ACL types of said at least two ACL types;
   based on said determining that said privilege is not a member of an intersection set, denying said privilege for said request; and
   wherein the steps of determining and denying are performed by one or more computing devices.

2. The machine-implemented method of claim 1, wherein said intersection set is a null set containing no privileges.

3. The machine-implemented method of claim 1, wherein determining that said privilege is not a member of said intersection set further comprises:
   determining that two ACL types of said at least two ACL types have a common ACL type ancestor in an ACL hierarchy; and
   using privileges of said common ACL type ancestor to determine said intersection set.

4. The machine-implemented method of claim 1, wherein determining that said privilege is not a member of said intersection set further comprises:
   determining that a pair of ACL types of said at least two ACL types have an ancestor-descendent relationship in an ACL hierarchy; and
   using privileges of an ACL type ancestor of the pair to determine said intersection set, without inspecting privileges of an ACL type descendent of the pair.

5. The machine-implemented method of claim 1, wherein said at least two ACLs are a parent ACL, and a child ACL that is constrained with the parent ACL.

6. The machine-implemented method of claim 1, further comprising:
   prior to receiving said request, determining said intersection set containing said privileges that are common to all ACL types of said at least two ACL types; and
   storing said intersection set in a cache.

7. The machine-implemented method of claim 6:
   wherein said at least two ACL types includes a first ACL type associated with a first ACL, and a second ACL type associated with a second ACL; and
   wherein modifications made to said first ACL do not invalidate said intersection set stored in said cache.

8. The machine-implemented method of claim 7, wherein said first ACL is a global ACL of a global ACL type.

9. The machine-implemented method of claim 1, wherein determining that said privilege is not a member of said intersection set further comprises:
   reading, from a cache, said intersection set; and
   denying said privilege for said request, based on said intersection set read from said cache.

10. A machine-implemented method, comprising:
    receiving a request that requires a privilege for a resource;
    wherein said resource is protected by at least two ACLs;
    wherein said at least two ACLs are associated with at least two ACL types, wherein among said at least two ACLs and said at least two ACL types, each ACL is associated with a different ACL type that is not associated any other ACL;
    if said privilege is not a member of a union set containing privileges that are contained in at least one ACL type of said at least two ACL types then denying said privilege for said request;
    if said privilege is a member of said union set then denying said privilege for said request if at least one ACL of said at least two ACLs denies said privilege to said user; and
    wherein the steps of determining and denying are performed by one or more computing devices.

11. The machine-implemented method of claim 10, wherein said union set is read from a cache.

12. A machine-implemented method for access resolution, comprising:
    receiving a request, for grant of a privilege for a resource;
    wherein said resource is protected by at least two ACLs;
    wherein said at least two ACLs are associated with at least two ACL types, wherein among said at least two ACLs and said at least two ACL types, each ACL is associated with a different ACL type that is not associated any other ACL;
    if said privilege is not a member of a union set containing privileges that are contained in at least one ACL type of said at least two ACL types then denying said privilege for said request;
    if said privilege is a member of said union set then granting said privilege for said request if at least one ACL of said at least two ACLs grants said privilege to said user; and
    wherein the steps of determining and denying are performed by one or more computing devices.

13. One or more non-volatile storage media storing instructions which, when executed by one or more computing devices, cause performance of:
    receiving a request that requires a privilege for a resource;
    wherein said resource is protected by at least two ACLs;
    wherein said at least two ACLs are associated with at least two ACL types, wherein among said at least two ACLs and said at least two ACL types, each ACL is associated with a different ACL type that is not associated any other ACL;
    determining that said privilege is not a member of an intersection set containing privileges that are common to all ACL types of said at least two ACL types;
    based on said determining that said privilege is not a member of an intersection set, denying said privilege for said request; and
    wherein the steps of determining and denying are performed by one or more computing devices.

14. The one or more non-volatile storage media of claim 13, wherein said intersection set is a null set containing no privileges.

15. The one or more non-volatile storage media of claim 13, wherein determining that said privilege is not a member of said intersection set further comprises:
   determining that two ACL types of said at least two ACL types have a common ACL type ancestor in an ACL hierarchy; and
   using privileges of said common ACL type ancestor to determine said intersection set.

16. The one or more non-volatile storage media of claim 13, wherein determining that said privilege is not a member of said intersection set further comprises:
   determining that a pair of ACL types of said at least two ACL types have an ancestor-descendent relationship in an ACL hierarchy; and
   using privileges of an ACL type ancestor of the pair to determine said intersection set, without inspecting privileges of an ACL type descendent of the pair.

17. The one or more non-volatile storage media of claim 13, wherein said at least two ACLs are a parent ACL, and a child ACL that is constrained with the parent ACL.

18. The one or more non-volatile storage media of claim 13, the steps further comprising:
   prior to receiving said request, determining said intersection set containing said privileges that are common to all ACL types of said at least two ACL types; and
   storing said intersection set in a cache.

19. The one or more non-volatile storage media of claim 18:
   wherein said at least two ACL types includes a first ACL type associated with a first ACL, and a second ACL type associated with a second ACL; and
   wherein modifications made to said first ACL do not invalidate said intersection set stored in said cache.

20. The one or more non-volatile storage media of claim 19, wherein said first ACL is a global ACL of a global ACL type.

21. The one or more non-volatile storage media of claim 13, wherein determining that said privilege is not a member of said intersection set further comprises:
   reading, from a cache, said intersection set; and
   denying said privilege for said request, based on said intersection set read from said cache.

22. One or more non-volatile storage media storing instructions which, when executed by one or more computing devices, cause performance of:
   receiving a request that requires a privilege for a resource;
   wherein said resource is protected by at least two ACLs;
   wherein said at least two ACLs are associated with at least two ACL types, wherein among said at least two ACLs and said at least two ACL types, each ACL is associated with a different ACL type that is not associated any other ACL;
   if said privilege is not a member of a union set containing privileges that are contained in at least one ACL type of said at least two ACL types then denying said privilege for said request;
   if said privilege is a member of said union set then denying said privilege for said request if at least one ACL of said at least two ACLs denies said privilege to said user; and
   wherein the steps of determining and denying are performed by one or more computing devices.

23. The one or more non-volatile storage media of claim 22, wherein said union set is read from a cache.

24. One or more non-volatile storage media storing instructions which, when executed by one or more computing devices, cause performance of:
   receiving a request, for grant of a privilege for a resource;
   wherein said resource is protected by at least two ACLs;
   wherein said at least two ACLs are associated with at least two ACL types, wherein among said at least two ACLs and said at least two ACL types, each ACL is associated with a different ACL type that is not associated any other ACL;
   if said privilege is not a member of a union set containing privileges that are contained in at least one ACL type of said at least two ACL types then denying said privilege for said request;
   if said privilege is a member of said union set then granting said privilege for said request if at least one ACL of said at least two ACLs grants said privilege to said user; and
   wherein the steps of determining and denying are performed by one or more computing devices.

* * * * *

UNITED STATES PATENT AND TRADEMARK OFFICE
CERTIFICATE OF CORRECTION

| | | |
|---|---|---|
| PATENT NO. | : 8,095,557 B2 | Page 1 of 1 |
| APPLICATION NO. | : 12/433735 | |
| DATED | : January 10, 2012 | |
| INVENTOR(S) | : Ahmed et al. | |

It is certified that error appears in the above-identified patent and that said Letters Patent is hereby corrected as shown below:

In column 13, line 26, in Claim 1, delete "any" and insert -- with any --, therefor.

In column 14, line 18, in Claim 10, delete "any" and insert -- with any --, therefor.

In column 14, line 39, in Claim 12, delete "any" and insert -- with any --, therefor.

In column 14, line 58, in Claim 13, delete "any" and insert -- with any --, therefor.

In column 16, line 11, in Claim 22, delete "any" and insert -- with any --, therefor.

In column 16, line 32, in Claim 24, delete "any" and insert -- with any --, therefor.

Signed and Sealed this
Twenty-seventh Day of March, 2012

David J. Kappos
*Director of the United States Patent and Trademark Office*